(12) United States Patent
Wu

(10) Patent No.: US 10,365,516 B2
(45) Date of Patent: Jul. 30, 2019

(54) LIQUID CRYSTAL DEVICE AND THE ARRAY SUBSTRATE THEREOF

(71) Applicant: Shenzhen China Star Optoelectronics Technology Co., Ltd., Shenzhen, Guangdong (CN)

(72) Inventor: Chuan Wu, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 648 days.

(21) Appl. No.: 14/404,725

(22) PCT Filed: Nov. 25, 2014

(86) PCT No.: PCT/CN2014/092130
§ 371 (c)(1),
(2) Date: Dec. 1, 2014

(87) PCT Pub. No.: WO2016/078105
PCT Pub. Date: May 26, 2016

(65) Prior Publication Data
US 2016/0349576 A1 Dec. 1, 2016

(30) Foreign Application Priority Data

Nov. 18, 2014 (CN) .......................... 2014 1 0659948

(51) Int. Cl.
*G02F 1/1335* (2006.01)
*G02F 1/1343* (2006.01)
*G02F 1/1362* (2006.01)

(52) U.S. Cl.
CPC .... *G02F 1/134309* (2013.01); *G02F 1/13439* (2013.01); *G02F 1/133512* (2013.01); *G02F 1/136209* (2013.01); *G02F 1/136286* (2013.01); *G02F 2001/136218* (2013.01); *G02F 2001/136295* (2013.01); *G02F 2201/121* (2013.01)

(58) Field of Classification Search
CPC ......... G02F 1/134309; G02F 1/133512; G02F 1/13439
See application file for complete search history.

(56) References Cited

U.S. PATENT DOCUMENTS

| | | | |
|---|---|---|---|
| 7,499,137 B2 * | 3/2009 | Liao | G02F 1/133514 349/139 |
| 2004/0169777 A1 * | 9/2004 | Tanaka | G02F 1/133707 349/39 |
| 2004/0174483 A1 | 9/2004 | Nakamura | |
| 2006/0139542 A1 | 6/2006 | Ando | |

(Continued)

FOREIGN PATENT DOCUMENTS

| | | |
|---|---|---|
| CN | 101091135 A | 12/2007 |
| CN | 101520579 A | 9/2009 |

(Continued)

*Primary Examiner* — Lucy P Chien
(74) *Attorney, Agent, or Firm* — Andrew C. Cheng

(57) ABSTRACT

A liquid crystal device and an array substrate are disclosed. At least one data line and at least one pixel cell are arranged on the array substrate. A gap is formed between the data line and the pixel cell, and an electrode is arranged on the gap to cover the gap. In this way, the light leakage is avoided.

4 Claims, 1 Drawing Sheet

(56) References Cited

U.S. PATENT DOCUMENTS

| | | | |
|---|---|---|---|
| 2009/0141228 A1* | 6/2009 | Shih | G02F 1/134309 |
| | | | 349/139 |
| 2012/0181557 A1 | 7/2012 | Kim | |
| 2013/0105831 A1 | 5/2013 | Li | |
| 2013/0342890 A1* | 12/2013 | Shim | G09G 3/348 |
| | | | 359/290 |
| 2015/0042922 A1* | 2/2015 | Kawahira | G02F 1/133555 |
| | | | 349/61 |

FOREIGN PATENT DOCUMENTS

| | | |
|---|---|---|
| CN | 102736325 A | 10/2012 |
| CN | 202522819 U | 11/2012 |
| CN | 103941488 A | 7/2014 |

* cited by examiner

LIQUID CRYSTAL DEVICE AND THE ARRAY SUBSTRATE THEREOF

BACKGROUND OF THE INVENTION

1. Field of the Invention

The present disclosure relates to liquid crystal display technology, and more particularly to a liquid crystal device (LCD) and the array substrate thereof.

2. Discussion of the Related Art

As shown in FIG. 1, one conventional Thin Film Transistor Liquid Crystal Display (TFT-LCD) 10 includes an up substrate 11, a down substrate 12, a data line 13 and a pixel cell 14 arranged above the down substrate 12. There is a gap between the data line 13 and the pixel cell 14. When the up substrate 11 and the down substrate 12 are dislocated, the gap between the data line 13 and the pixel cell 14 becomes larger. When the LCD 10 displays a white image, a voltage difference is generated in the gap as the data line 13 carries electricity. As such, the liquid crystal located close to the gap and the up substrate 11 change their alignment, which results in light leakage.

SUMMARY

The LCD and the array substrate thereof are capable of avoiding the light leakage.

In one aspect, an array substrate includes: at least one data line and at least one pixel cell being arranged on the array substrate, a gap is formed between the data line and the pixel cell, an electrode is arranged on the gap to cover the gap; an up substrate being arranged above the array substrate, the up substrate comprises a black matrix and a common electrode, the black matrix being arranged above the data line, and the common electrode covers the up substrate and the black matrix; and the electrode electrically connects to the common electrode, and the electrode is an Indium Tin Oxides (ITO) electrode.

Wherein a liquid crystal layer being arranged between the array substrate and the up substrate, and liquid crystals within the liquid crystal layer between the electrode and the common electrode are not twisted.

In another aspect, an array substrate includes: at least one data line and at least one pixel cell being arranged on the array substrate, a gap is formed between the data line and the pixel cell, and an electrode is arranged on the gap to cover the gap.

Wherein an up substrate being arranged above the array substrate, the up substrate comprises a black matrix and a common electrode, the black matrix being arranged above the data line, and the common electrode covers the up substrate and the black matrix.

Wherein the electrode electrically connects to the common electrode.

Wherein a liquid crystal layer being arranged between the array substrate and the up substrate, and liquid crystals within the liquid crystal layer between the electrode and the common electrode are not twisted.

Wherein the electrode is an Indium Tin Oxides (ITO) electrode.

In another aspect, a liquid crystal device includes: an array substrate, at least one data line and at least one pixel cell being arranged on the array substrate, a gap is formed between the data line and the pixel cell, and an electrode is arranged on the gap to cover the gap.

Wherein an up substrate being arranged above the array substrate, the up substrate comprises a black matrix and a common electrode, the black matrix being arranged above the data line, and the common electrode covers the up substrate and the black matrix.

Wherein the electrode electrically connects to the common electrode.

Wherein a liquid crystal layer being arranged between the array substrate and the up substrate, and liquid crystals within the liquid crystal layer between the electrode and the common electrode are not twisted.

Wherein the electrode is an ITO electrode.

In view of the above, an electrode is arranged in the gap between the data line and the pixel cell. The electrode is configured for covering the gap so as to avoid the light leakage.

DETAILED DESCRIPTION OF THE EMBODIMENTS

Embodiments of the invention will now be described more fully hereinafter with reference to the accompanying drawings, in which embodiments of the invention are shown.

Figure 1:
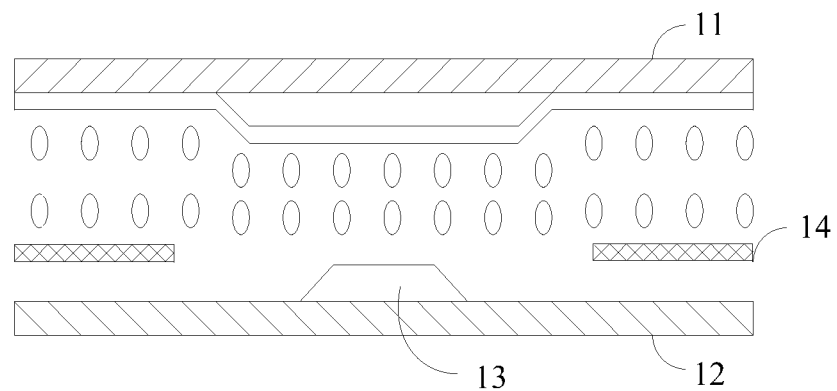
FIG. 1 is a schematic view of one conventional LCD.
Figure 2:
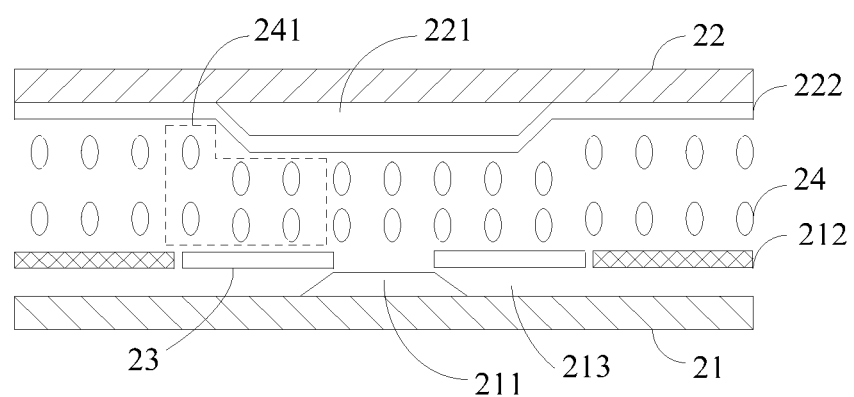
FIG. 2 is a schematic view of the LCD in accordance with one embodiment.

FIG. 2 is a schematic view of the LCD in accordance with one embodiment. The LCD 20 includes an array substrate 21, an up substrate 22, and an electrode 23.

The array substrate 21 includes a data line 211 and a pixel cell 212 arranged thereon. There is a gap 213 between the data line 211 and the pixel cell 212. The up substrate 22 is arranged above the array substrate 21. The up substrate 22 includes a black matrix 221 and a common electrode 222. The black matrix 221 is arranged above the data line 211. That is, the black matrix 221 is right above the data line 211. The common electrode 222 covers the up substrate 22 and the black matrix 221. Preferably, the common electrode 222 is Indium Tin Oxides (ITO). The electrode 23 is arranged above the gap 213. That is, the electrode 23 is for covering the gap 213 to avoid light leakage.

In the embodiment, the LCD 20 further includes a liquid crystal layer 24 arranged between the array substrate 21 and the up substrate 22. Light beams cannot emit out from the liquid crystal layer 24 if the liquid crystal within the liquid crystal layer 24 have not been twisted. That is, the light beams emit out from the liquid crystal layer 24 when the liquid crystal layer 24 is twisted.

In one embodiment, the electrode 23 electrically connects to the common electrode. As there is no voltage difference between the electrode 23 and the common electrode 222, the liquid crystals within the liquid crystal layer 24 between the electrode 23 and the common electrode 222 are not twisted such that the light beams cannot emit out from the liquid crystal layer 24 so as to avoid light leakage.

Preferably, the electrode 23 is ITO electrode. When manufacturing the ITO mask of the LCD 20, the ITO is manufactured above the gap 213 to form the electrode 23. Thus, the electrode 23 may be formed without additional manufacturing process. In addition, the width of the data line 211 has not to be widen, which decreases the aperture rate of the LCD 20.

In the embodiment, the electrode 23 is arranged on the gap 213 between the data line 211 and the pixel cell 212. The electrode 23 covers the gap 213 to avoid the light leakage.

In addition, the electrode 23 may be formed without additional manufacturing process.

In addition, the claimed invention also disclose one array substrate for the LCD 20. The array substrate may be the array substrate 21 as described above.

In view of the above, the electrode 23 is arranged on the gap 213 between the data line 211 and the pixel cell 212. The electrode 23 covers the gap 213 to avoid the light leakage. In addition, the electrode 23 may be formed without additional manufacturing process.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An array substrate, comprising:
   at least one data line and at least one pixel cell being arranged on the array substrate, wherein a gap is formed between the at least one data line and the at least one pixel cell, an electrode is arranged on the gap to cover the gap; and
   an up substrate being arranged above the array substrate, wherein the up substrate comprises a black matrix and the common electrode, the black matrix being arranged above the at least one data line, and the common electrode covers the up substrate and the black matrix;
   wherein the at least one data line connects to a first voltage, the electrode electrically connects to the common electrode to be a second voltage, the first voltage is different from the second voltage and the electrode is an Indium Tin Oxides (ITO) electrode; and
   wherein a liquid crystal layer being arranged between the common electrode and at least one pixel cell, and between the common electrode and the electrode arranged on the gap to cover the gap; the electrode arranged on the gap to cover the gap, the at least one data line, and the at least one pixel cell are located at the same side of the liquid crystal layer; the common electrode is spaced apart from the electrode arranged on the gap to cover the gap, and located at one side of the liquid crystal layer that is opposite to the electrode arranged on the gap to cover the gap, and no voltage difference is generated between the electrode arranged on the gap to cover the gap and the common electrode;
   liquid crystals within the liquid crystal layer between the electrode arranged on the gap to cover the gap and the common electrode are not twisted.

2. A liquid crystal device, comprising:
   an array substrate, at least one data line, and at least one pixel cell being arranged on the array substrate, a gap is formed between the data line and the pixel cell, and an electrode is arranged on the gap to cover the gap;
   an up substrate being arranged above the array substrate, wherein the up substrate comprises a black matrix and the common electrode, the black matrix being arranged above the data line, and the common electrode covers the up substrate and the black matrix;
   wherein the at least one data line connects to a first voltage, the electrode electrically connects to the common electrode being arranged on the up substrate to be a second voltage, the first voltage is different from the second voltage and the electrode is an Indium Tin Oxides (ITO) electrode; and
   wherein a liquid crystal layer being arranged between the common electrode and at least one pixel cell, and between the common electrode and the electrode arranged on the gap to cover the gap; the electrode arranged on the gap to cover the gap, the at least one data line, and the at least one pixel cell are located at the same side of the liquid crystal layer; the common electrode is spaced apart from the electrode arranged on the gap to cover the gap, and located at one side of the liquid crystal layer that is opposite to the electrode arranged on the gap to cover the gap, and no voltage difference is generated between the electrode arranged on the gap to cover the gap and the common electrode;
   liquid crystals within the liquid crystal layer between the electrode arranged on the gap to cover the gap and the common electrode are not twisted.

3. The array substrate as claimed in claim 1, wherein the at least one data line is partly covered by the electrode.

4. The liquid crystal device as claimed in claim 2, wherein the at least one data line is partly covered by the electrode.

* * * * *